D. HUMPHREYS.
Hand-Seeder.
No. 56,053. Patented July 3, 1866.
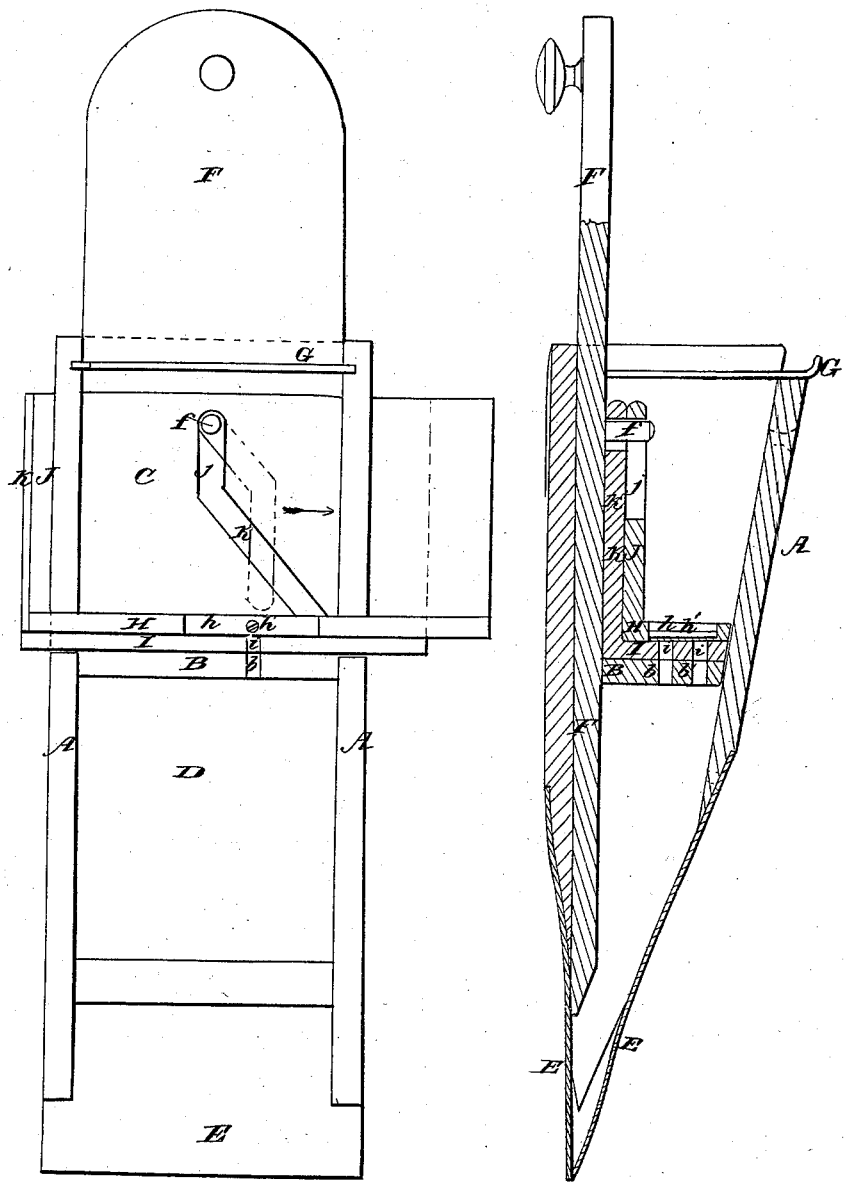

UNITED STATES PATENT OFFICE.

D. HUMPHREYS, OF OSKALOOSA, IOWA.

IMPROVEMENT IN HAND CORN-PLANTERS.

Specification forming part of Letters Patent No. 56,053, dated July 3, 1866.

*To all whom it may concern:*

Be it known that I, DAVID HUMPHREYS, of Oskaloosa, Mahaska county, Iowa, have invented a new and useful Hand Corn-Planter; and I do hereby declare the following to be a full, clear, and exact description thereof, reference being had to the accompanying drawing, making part of this specification.

My invention relates to the class of corn-planters which comprise a box whose upper part forms a hopper or receptacle for the seed and whose lower part serves the double purpose of penetrating the ground and conducting the seed thereto, the seed being both measured and buried by the action of a reciprocating plunger.

The following parts may be of the represented or any approved construction.

A is a box, having a floor, B, which separates the grain-hopper C from the conductor D, closed at bottom by elastic lips E, which serve the twofold purpose of penetrating the ground and of temporarily holding the grain until the descent of the plunger F. G is a slide for closing the mouth of the hopper. $b$ $b'$ are openings in the floor for the passage of grain.

The following parts embody my improvement in the seed-distributing apparatus of hand corn-planters.

H and I are two slides, of which the upper one, H, is traversed by a large opening, $h$, and by a rod, $h'$, while the lower slide is traversed by one or more small openings, $i$ $i'$, which correspond to those, $b$ $b'$, in the floor. Each slide has a vertical wing, J K, slotted ($j$ $k$) in the manner shown, so that a pin or stud, $f$, projecting from the plunger F, and occupying said slots, shall act, on the elevation of said plunger, to first move the upper slide laterally over the other one in direction of the arrow, so as to bring it to the position shown in the drawing, and causing the rod $h$ to sweep the openings $i$ $i'$ full of seed, when the pin or stud, reaching the vertical part of the slot $j$, ceases to act on the slide J, and reaching at the same instant the oblique portion of the slot $k$, moves the slide I, as per arrow, so as to bring its now charged openings $i$ $i'$, at the same time over the openings $b$ $b'$ and under the rod $h'$, which rod is thereby again made useful, and serves to sweep into the openings $i$ $i'$ whatever they may lack of being filled by the first movement, and to guard the mouths of the openings from the entrance of any more grains while discharging into the openings $b$ $b'$.

The plunger is lifted by the act of lifting the planter from the ground preparatory to its insertion in the next hill, which having been effected, the plunger is depressed, and in so doing acts to restore the slides to their original positions, and by the same movement to press into the ground the quantum of seed that had been dropped into the conductor.

I claim herein as new and of my invention—

The arrangement, in a hand corn-planter, of the compound slide H I, having the described slotted wings J $j$ and K $k$, openings $b'$ and $i$ $i'$, and rod $h'$, in combination with the stud $f$ on the plunger F and the openings $b$ $b'$ in the floor B, as set forth.

In testimony of which invention I hereunto set my hand.

D. HUMPHREYS.

Witnesses:
SAMUEL THOMPSON,
GEO. H. KNIGHT.